United States Patent
Tang

(10) Patent No.: US 11,706,156 B2
(45) Date of Patent: Jul. 18, 2023

(54) METHOD AND SYSTEM FOR CHANGING RESOURCE STATE, TERMINAL, AND STORAGE MEDIUM

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 66 days.

(21) Appl. No.: 17/511,232

(22) Filed: Oct. 26, 2021

(65) Prior Publication Data

US 2022/0052962 A1 Feb. 17, 2022

Related U.S. Application Data

(63) Continuation of application No. PCT/CN2019/085216, filed on Apr. 30, 2019.

(51) Int. Cl.
*H04L 47/70* (2022.01)
*G16Y 10/80* (2020.01)
*G16Y 10/75* (2020.01)

(52) U.S. Cl.
CPC .............. *H04L 47/82* (2013.01); *G16Y 10/75* (2020.01); *G16Y 10/80* (2020.01)

(58) Field of Classification Search
CPC ........ G16Y 10/75; G16Y 10/80; H04L 47/82; H04L 12/28; H04L 47/782; H04L 47/803; H04L 47/822; H04L 69/32; G06F 9/48
See application file for complete search history.

(56) References Cited

U.S. PATENT DOCUMENTS

| | | | |
|---|---|---|---|
| 8,234,650 B1* | 7/2012 | Eppstein | G06F 9/5072 718/100 |
| 8,640,137 B1* | 1/2014 | Bostic | G06F 9/5072 718/104 |

FOREIGN PATENT DOCUMENTS

| | | | |
|---|---|---|---|
| CN | 1753374 A | | 3/2006 |
| CN | 102263776 A | | 11/2011 |

(Continued)

OTHER PUBLICATIONS

International Search Report and Written Opinion dated Jan. 19, 2020 in International Application No. PCT/CN2019/085216. English translation attached.

(Continued)

*Primary Examiner* — Jason D Recek
(74) *Attorney, Agent, or Firm* — Sheppard, Mullin, Richter & Hampton LLP

(57) ABSTRACT

The present disclosure discloses a method and apparatus for changing a resource state, a terminal, and a storage medium, which belong to the field of smart home. A system for changing a resource state that includes a first collection resource, a first intermediate-level resource, and leaf node resources can be established. By making the first collection resource obtain link information of each leaf node resource whose resource state needs to be changed, a request that includes a default interface of the leaf node resource may be generated for the leaf node resource, such that a state of the leaf node resource can be changed accurately by the system. Therefore, the present disclosure enables the control request issued by a client to be recognized and executed by each leaf node resource, thereby increasing reliability and stability of system control.

18 Claims, 5 Drawing Sheets

(56) References Cited

FOREIGN PATENT DOCUMENTS

| CN | 102394826 A | 3/2012 |
|---|---|---|
| CN | 105228121 A | 1/2016 |
| CN | 107979871 A | 5/2018 |

OTHER PUBLICATIONS

3GPP, "TS 29.201", Representational State Transfer (REST) reference point between Application Function (AF) and Protocol Converter (PC) (Release 13), Dec. 31, 2016, full text, 36 pages.

* cited by examiner

METHOD AND SYSTEM FOR CHANGING RESOURCE STATE, TERMINAL, AND STORAGE MEDIUM

CROSS-REFERENCE TO RELATED APPLICATION

The present application is a continuation of International Application No. PCT/CN2019/085216, filed on Apr. 30, 2019, the entire contents of which are incorporated herein by reference.

TECHNICAL FIELD

The present disclosure relates to a field of smart home, and more particularly, to a method and system for changing a resource state, a terminal, and a storage medium.

RELATED ART

With the widespread application of the Internet of Things (IoT) technologies in the field of smart home, there is a growing demand for a user to control all devices in a smart home system with one key.

In the related art, the smart home system needs to control all the devices in the system. In a networking mode, controlled devices are all located at leaf nodes. When a device at a higher level in the smart home system receives a one-key control request from a client, the device at the higher level transmits the control request level by level through the established network, until all controlled devices receive the control request and respond to the request.

SUMMARY

Embodiments of the present disclosure provide a method and system for changing a resource state, a terminal, and a storage medium. The technical solutions are as follows.

In an aspect, a method for changing a resource state is provided. The method is applied in a first collection resource. The first collection resource is directly linked to a first intermediate-level resource and directly linked to n1 leaf node resources, and the first intermediate-level resource is linked to m second intermediate-level resources and linked to n−n1 leaf node resources, where m is a natural number, n is a positive integer, and n1 is a natural number not greater than n. The method includes: generating, by the first collection resource in response to receiving a first request transmitted by a client, a second request based on a link information obtaining interface. The first request is used to instruct each leaf node resource to perform a state change operation, the second request is used to obtain link information of the leaf node resources, and the link information obtaining interface is configured to obtain link information of resources corresponding to the link information obtaining interface. The method includes: transmitting, by the first collection resource, the second request to the first intermediate-level resource; and generating, by the first collection resource in response to receiving the link information of each leaf node resource transmitted by the first intermediate-level resource, a third request based on the link information of the leaf node resource. The third request includes a state change interface which is a default interface of the leaf node resource and is configured to change the state of the leaf node resource. The method includes: transmitting, by the first collection resource, the third request to the leaf node resource.

In another aspect, a method for changing a resource state is provided. The method is applied in a first intermediate-level resource. A first collection resource is directly linked to the first intermediate-level resource and directly linked to n1 leaf node resources, and the first intermediate-level resource is linked to m second intermediate-level resources and linked to n−n1 leaf node resources, where m is a natural number, n is a positive integer, and n1 is a natural number not greater than n. The method includes: obtaining, by the first intermediate-level resource in response to receiving a second request, link information of each leaf node resource. The second request is generated by the first collection resource based on a link information obtaining interface in response to receiving a first request transmitted by a client, and the link information obtaining interface is configured to obtain link information of resources corresponding to the link information obtaining interface. The method includes transmitting, by the first intermediate-level resource, the link information of each leaf node resource to the first collection resource. The link information of the leaf node resource is used to instruct the first collection resource to generate a third request, and the third request includes a state change interface which is a default interface of the leaf node resource and is configured to change a state of the leaf node resource.

In another aspect, an apparatus for changing a resource state is provided. The apparatus includes a processor and a memory. The memory stores at least one instruction. The at least one instruction is loaded and executed by the processor to perform the method for changing the resource state that is applied in a first collection resource according to an embodiment of the present disclosure.

In another aspect, an apparatus is provided. The apparatus includes a processor and a memory. The memory stores at least one instruction. The at least one instruction is loaded and executed by the processor to perform the method for changing the resource state that is applied in a first intermediate-level resource according to an embodiment of the present disclosure.

In another aspect, a computer-readable storage medium having at least one instruction stored thereon is provided. The at least one instruction is loaded and executed by a processor to perform the method for changing the resource state that is applied in a first collection resource.

In another aspect, a computer-readable storage medium having at least one instruction stored thereon is provided. The at least one instruction is loaded and executed by a processor to perform the method for changing the resource state that is applied in a first intermediate-level resource.

BRIEF DESCRIPTION OF DRAWINGS

In order to clearly explain technical solutions of embodiments of the present disclosure, drawings used in the embodiments are briefly described below. Obviously, the drawings as described below are merely some embodiments of the present disclosure. Based on these drawings, other drawings can be obtained by those skilled in the art without creative effort.

DESCRIPTION OF EMBODIMENTS

Figure 1:
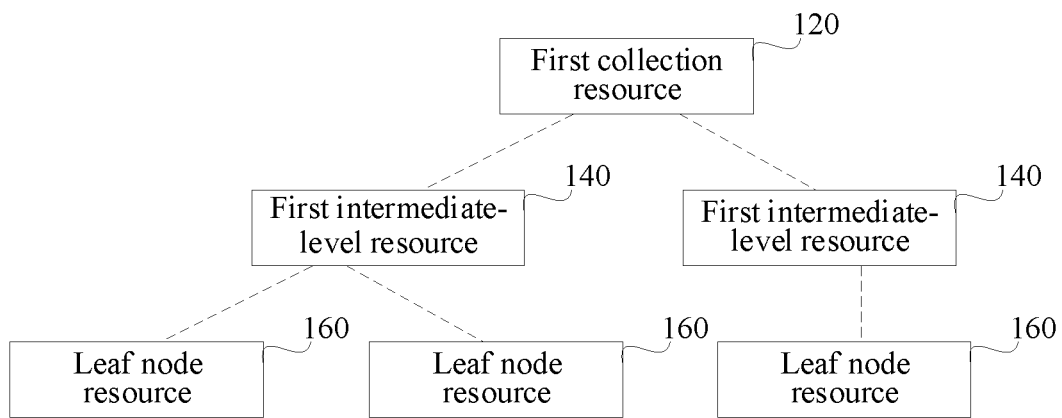
FIG. 1 is a schematic diagram illustrating a link relationship between resources according to an embodiment of the present disclosure.

In order to make objects, technical solutions, and advantages of the present disclosure clearer, embodiments of the present disclosure will be further described in detail below in combination with the accompanying drawings.

With the popularization and application of IoT technologies in the field of smart home, smart home systems are designed with a compatible and easy-to-maintain architecture. In some application scenarios, a smart home system based on Representational State Transfer (REST) architecture can describe a thing or a device in a network in terms of a resource. Thus, things or devices in the architecture are all easier to control, making the REST architecture a widely chosen architecture for designers of the smart home system. In at least one embodiment, each of a system, method, and apparatus for changing a resource state, a terminal, and a storage medium disclosed by the present disclosure can be applied in the REST architecture.

In the smart home system based on the REST architecture, operation methods that a resource can receive include but are not limited to CURDN. Specifically, CURDN can be Create, Update, Retrieve, Delete, and Notification. It should be noted that CURDN is a basic operation type of the REST architecture.

In the smart home system based on the REST architecture, a collection resource is defined in a process of resource description. One collection resource can include a plurality of linked resources. It should be noted that a resource can be both the linked resource and the collection resource, or the linked resource only, or the collection resource only.

In an embodiment, the resource may be a linked collection resource. The linked collection resource is both the linked resource and the collection resource.

In an embodiment of the present disclosure, the resource needs to perform a related operation according to the received request in a network architecture. In an embodiment of the present disclosure, a request includes operation method+operation target+operation means. It should be noted that the above operation method may be at least one of CURDN operations. The operation target can be an address of the resource in the network, such as a Uniform Resource Identifier (URI). The operation means can be an interface type, which can also be called an interface attribute.

It should be noted that in the present disclosure, each resource has its own list of supported interfaces when the resource is designed for networking. In the list of interfaces, there is a default interface supported by the resource correspondingly. For example, when a resource R1 is designed for networking, the list of supported interfaces is as follows:

TABLE 1

| Resource identifier | R1 | R1 | R1 |
|---|---|---|---|
| Supported interfaces | interface A (default interface) | interface B | interface C |

According to the content illustrated in Table 1, interfaces supported by the resource R1 include interface A, interface B and interface C. In practical applications, when a request received by the resource R1 includes one of the above interfaces, the resource R1 can invoke a relevant interface correctly and complete a corresponding operation. When the request received by the resource R1 does not include any of the above interfaces, the resource R1 will invoke the default interface to perform the corresponding operation. In some scenarios, the resource R1 will return an error indication, such that the resource transmitting a related request or the resource R1 cannot correctly execute the related request.

In a smart home system designed based on the REST architecture, in response to receiving a request that includes a batch interface, the first collection resource can decompose, based on a number of leaf node resources linked by the first collection resource, the request into a corresponding number of sub-requests. Each decomposed sub-request is transmitted to a leaf node resource. It is hoped that the leaf node resource will successfully perform an operation corresponding to the request after receiving the decomposed sub-request.

With the method according to an embodiment of the present disclosure, an operation method for the collection resource can be implemented. When a batch operation request is received, the batch operation request is decomposed into fourth requests based on a number of the linked collection resources. The fourth requests each invokes a target interface. The target interface is used to obtain link information of each resource contained in the linked collection resource. When a link list returned by the linked collection resources is received, a fifth request is transmitted to each non-collection resource. The fifth request is used to instruct the non-collection resource to perform a corresponding operation. In at least one embodiment, the corresponding operation is an operation for changing the non-collection resource.

In at least one embodiment, with the operation method of the collection resource according to the above embodiment, the target interface is a link list interface (abbreviation: oic.if.ll). As an achievable function, a role of the oic.if.ll interface is to obtain the link information of each linked resource of the collection resource. The link information is information describing the linked resource. The link information includes interface information, a resource identifier, and/or a resource type. In at least one embodiment, the link information includes state attribute information. The state attribute information is information describing a state of a device. For example, the state attribute information can be an ON state of a lamp, or an OFF state of the lamp. In an embodiment of the present disclosure, the first collection resource can operate a device corresponding to each leaf node resource by modifying its state attribute.

In at least one embodiment, with the operation method of the collection resource according to the above embodiment, the target interface is a batch link list interface (abbreviation: oic.if.bll). As an achievable function, a role of the oic.if.bll interface is to obtain the link information of each leaf node.

In at least one embodiment, with the operation method of the collection resource according to the above embodiment, an interface included in the fifth request is the default interface of the above non-collection resource.

In an aspect, a system for changing a resource state is provided. The system includes a first collection resource, a first intermediate-level resource, m second intermediate-level resources, and n leaf node resources. The first collection resource is directly linked to the first intermediate-level resource and/or directly linked to n1 of the leaf node resources, and the first intermediate-level resource is linked to the m second intermediate-level resources and/or linked to n−n1 of the leaf node resources, where m is a natural number, n is a positive integer, and n1 is a natural number not greater than n. The first collection resource is configured to generate, in response to receiving a first request transmitted by a client, a second request based on a link information obtaining interface, the first request is used to instruct each leaf node resource to perform a state change operation, and the link information obtaining interface is configured to obtain link information of corresponding resources. The first collection resource is configured to transmit the second request to the first intermediate-level resource. The first intermediate-level resource is configured to obtain, in response to receiving the second request, link information of each leaf node resource. The first intermediate-level resource is configured to transmit the link information of each leaf node resource to the first collection resource. The first collection resource is configured to generate a third request based on the link information of each leaf node resource. The third request includes a state change interface which is a default interface of the leaf node resource and is configured to change a state of the leaf node resource. The first collection resource is configured to transmit the third request to the leaf node resource.

In an aspect, a method for changing a resource state is provided. The method is applied in a first collection resource. The first collection resource is directly linked to a first intermediate-level resource and/or directly linked to n1 leaf node resources, and the first intermediate-level resource is linked to m second intermediate-level resources and/or linked to n−n1 leaf node resources, where m is a natural number, n is a positive integer, and n1 is a natural number not greater than n. The method includes generating, in response to receiving a first request transmitted by a client, a second request based on a link information obtaining interface. The first request is used to instruct each leaf node resource to perform a state change operation, the second request is used to obtain link information of the leaf node resources, and the link information obtaining interface is configured to obtain link information of resources corresponding to the link information obtaining interface. The method includes: transmitting the second request to the first intermediate-level resource; and generating, in response to receiving the link information of each leaf node resource transmitted by the first intermediate-level resource, a third request based on the link information of the leaf node resource. The third request includes a state change interface which is a default interface of the leaf node resource and is configured to change the state of the leaf node resource. The method includes transmitting the third request to the leaf node resource.

In an embodiment, the resources corresponding to the link information obtaining interface include: one or more resources processed by the link information obtaining interface, and one or more leaf node resources to which each of the one or more resources is directly linked.

In an embodiment, the resources corresponding to the link information obtaining interface include: one or more resources processed by the link information obtaining interface, and one or more leaf node resources to which each of the one or more resources is linked in a nested manner.

In an embodiment, generating, in response to receiving the link information of each leaf node resource transmitted by the first intermediate-level resource, the third request based on the link information of the leaf node resource includes: generating, in response to receiving the link information of the leaf node resource transmitted by the first intermediate-level resource, a second collection resource directly linked to the leaf node resource; and generating, through the second collection resource, the third request based on the link information of the leaf node resource. Transmitting the third request to the leaf node resource includes: transmitting the third request to the leaf node resource through the second collection resource.

In an embodiment, the link information of each leaf node resource includes at least one of a resource identifier, an interface type, port information, and a resource type.

In an aspect, a method for changing a resource state is provided. The method is applied in a first intermediate-level resource. A first collection resource is directly linked to the first intermediate-level resource and/or directly linked to n1 leaf node resources, and the first intermediate-level resource is linked to m second intermediate-level resources and/or linked to n−n1 leaf node resources, where m is a natural number, n is a positive integer, and n1 is a natural number not greater than n. The method includes obtaining, in response to receiving a second request, link information of each leaf node resource. The second request is generated by the first collection resource based on a link information obtaining interface in response to receiving a first request transmitted by a client, and the link information obtaining interface is configured to obtain link information of resources corresponding to the link information obtaining interface. The method includes transmitting the link information of each leaf node resource to the first collection resource. The link information of the leaf node resource is used to instruct the first collection resource to generate a third request, and the third request includes a state change interface which is a default interface of the leaf node resource and is configured to change a state of the leaf node resource.

In an embodiment, the resources corresponding to the link information obtaining interface include: one or more resources processed by the link information obtaining interface, and one or more leaf node resources to which each of the one or more resources is directly linked.

In an embodiment, the resources corresponding to the link information obtaining interface include: one or more resources processed by the link information obtaining interface, and one or more leaf node resources to which each of the one or more resources is linked in a nested manner.

In an embodiment, obtaining, in response to receiving the second request, the link information of each leaf node resource includes obtaining, in response to receiving the second request, link information of each leaf node resource to which the first intermediate-level resource is directly linked.

In an embodiment, obtaining, in response to receiving the second request, the link information of each leaf node resource includes: obtaining, in response to receiving the second request, first sub-link information indicating link information of each leaf node resource to which the first intermediate-level resource is directly linked; and obtaining second sub-link information indicating link information of each leaf node resource to which the first intermediate-level resource is linked in a nested manner.

In an aspect, an apparatus for changing a resource state is provided. The apparatus is applied in a first collection resource. The first collection resource is directly linked to a first intermediate-level resource and/or directly linked to n1 leaf node resources, and the first intermediate-level resource is linked to m second intermediate-level resources and/or linked to n−n1 leaf node resources. The apparatus includes a first generation module, a first transmission module, a second generation module and a second transmission module. The first generation module is configured to generate, in response to receiving a first request transmitted by a client, a second request based on a link information obtaining interface. The first request is used to instruct each leaf node resource to perform a state change operation, the second request is used to obtain link information of the leaf node resources, and the link information obtaining interface is configured to obtain link information of resources corresponding to the link information obtaining interface. The first transmission module is configured to transmit the second request to the first intermediate-level resource. The second generation module is configured to generate, in response to receiving the link information of each leaf node resource transmitted by the first intermediate-level resource, a third request based on the link information of the leaf node resource. The third request includes a state change interface which is a default interface of the leaf node resource and is configured to change the state of the leaf node resource. The second transmission module is configured to transmit the third request to the leaf node resource.

In an aspect, an apparatus for changing a resource state is provided. The apparatus is applied in a first intermediate-level resource. A first collection resource is directly linked to the first intermediate-level resource and/or directly linked to n1 leaf node resources, and the first intermediate-level resource is linked to m second intermediate-level resources and/or linked to n−n1 leaf node resources, where m is a natural number, n is a positive integer, and n1 is a natural number not greater than n. The apparatus includes an information obtaining module and a third transmission module. The information obtaining module is configured to obtain, in response to receiving a second request, link information of each leaf node resource. The second request is generated by the first collection resource based on a link information obtaining interface in response to receiving a first request transmitted by a client, and the link information obtaining interface is configured to obtain link information of resources corresponding to the link information obtaining interface. The third transmission module is configured to transmit the link information of each leaf node resource to the first collection resource. The link information of the leaf node resource is used to instruct the first collection resource to generate a third request, and the third request includes a state change interface which is a default interface of the leaf node resource and is configured to change a state of the leaf node resource.

In another aspect, a terminal is provided. The terminal includes a processor and a memory. The memory stores at least one instruction. The at least one instruction is loaded and executed by the processor to perform the method for changing the resource state that is applied in a first collection resource according to an embodiment of the present disclosure.

In another aspect, a terminal is provided. The terminal includes a processor and a memory. The memory stores at least one instruction. The at least one instruction is loaded and executed by the processor to perform the method for changing the resource state that is applied in a first intermediate-level resource according to an embodiment of the present disclosure.

In another aspect, a computer-readable storage medium having at least one instruction stored thereon is provided. The at least one instruction is loaded and executed by a processor to perform the method for changing the resource state that is applied in a first collection resource.

In another aspect, a computer-readable storage medium having at least one instruction stored thereon is provided. The at least one instruction is loaded and executed by a processor to perform the method for changing the resource state that is applied in a first intermediate-level resource.

FIG. 1 is a schematic diagram illustrating a link relationship between resources according to an embodiment of the present disclosure. Referring to FIG. 1, resources involved in the system for changing the resource state disclosed by the present disclosure can be linked in accordance with the link relationship illustrated in FIG. 1. FIG. 1 includes a first collection resource 120, first intermediate-level resources 140, and leaf node resources 160.

It should be noted that the system for changing the resource state according to an embodiment of the present disclosure includes a first collection resource, first intermediate-level resources, m second intermediate-level resources, and n leaf node resources. In a scenario illustrated in FIG. 1, m is 0, n is 3, and n1 is 0. That is, the first collection resource 120 directly links to two first intermediate-level resources 140, and the two first intermediate-level resources 140 link to three leaf node resources. In this system, link in meaning includes direct link and nested link. In FIG. 1, link in meaning refers to direct link.

The first collection resource 120 includes the first intermediate-level resources 140. In an embodiment, when the first collection resource 120 includes a first intermediate-level resource 140, the first collection resource 120 is directly linked to the first intermediate-level resource 140. The first collection resource 120 may include at least one first intermediate-level resource 140.

A first intermediate-level resource 140 includes one or more leaf node resources 160. In the link relationship illustrated in FIG. 1, a first intermediate-level resource 140 directly links to a leaf node resource 160. A first intermediate-level resource 140 may link to at least one leaf node resource 160.

In the link relationship illustrated in FIG. 1, resources used by the system for changing the resource state include the first collection resource 120, the first intermediate-level resources 140, and the leaf node resources 160, which form a three-level link relationship. The first collection resource 120 is linked to the leaf node resources 160 in a nested manner.

Figure 2:
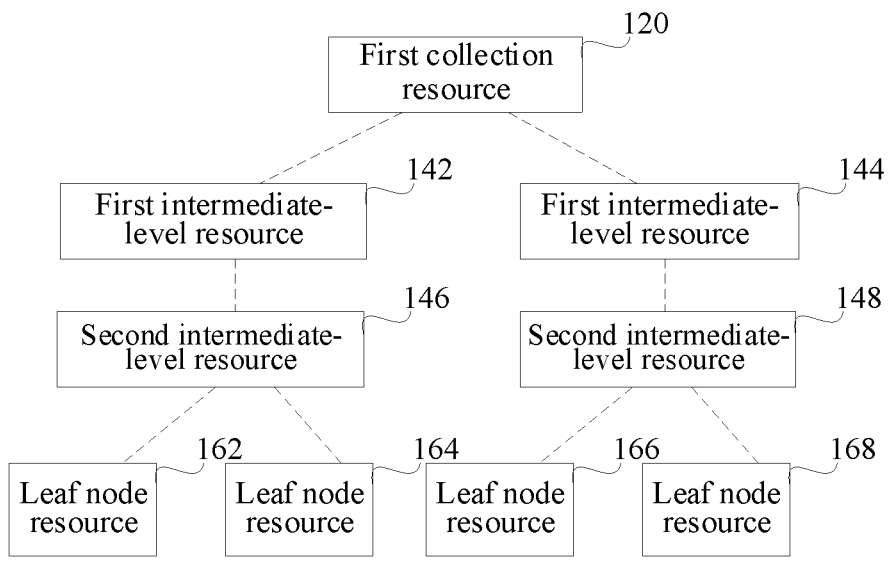
FIG. 2 is a schematic diagram illustrating another link relationship between resources according to an embodiment of the present disclosure.

FIG. 2 is a schematic diagram illustrating another link relationship between resources according to an embodiment of the present disclosure. As illustrated in FIG. 2, resources involved in the system for changing the resource state disclosed by the present disclosure can be linked in accordance with the link relationship illustrated in FIG. 1. FIG. 2 includes a first collection resource 120, a first intermediate-level resource 142, a first intermediate-level resource 144, a second intermediate-level resource 146, a second intermediate-level resource 148, a leaf node resource 162, a leaf node resource 164, a leaf node resource 166, and a leaf node resource 168.

It should be noted that the system for changing the resource state according to an embodiment of the present disclosure includes a first collection resource, first intermediate-level resources, m second intermediate-level resources, and n leaf node resources. In a scenario illustrated in FIG. 2, m is 2, n is 4, and n1 is 0. That is, the first collection resource 120 directly links to the first intermediate-level resource 142 and the first intermediate-level resource 144, and the first intermediate-level resource 142 and the first intermediate-level resource 144 link to a total of four leaf node resources.

In another embodiment of the present disclosure, under the first intermediate-level resource 142 or the first intermediate-level resource 144, other second intermediate-level resources besides the second intermediate-level resource 146 and the second intermediate-level resource 148 can be linked in a nested manner, and/or other leaf nodes can be linked in a nested manner, so as to form a multi-level nesting system with the first collection resource as a root node. According to an embodiment of the present disclosure, the number of levels that the system may include, the number of leaf node resources included in each level and the number of second intermediate-level resources are not limited.

In FIG. 2, a relationship of the direct link is as described below. The first collection resource 120 directly links to the first intermediate-level resource 142, and the first collection resource 120 directly links to the first intermediate-level resource 144.

The first intermediate-level resource 142 directly links to the second intermediate-level resource 146. The first intermediate-level resource 144 directly links to the second intermediate-level resource 148.

The second intermediate-level resource 146 directly links to the leaf node resource 162 and directly links to the leaf node resource 164. The second intermediate-level resource 148 directly links to the leaf node resource 166 and directly links to the leaf node resource 168.

In FIG. 2, a relationship of the nested link is as follows. The first collection resource 120 is linked to the second intermediate-level resource 146, the second intermediate-level resource 148, the leaf node resource 162, the leaf node resource 164, the leaf node resource 166, and the leaf node resource 168 in a nested manner.

The first intermediate-level resource 142 is linked to the leaf node resource 162 and the leaf node resource 164 in a nested manner.

The first intermediate-level resource 144 is linked to the leaf node resource 166 and the leaf node resource 168 in a nested manner.

Figure 3:
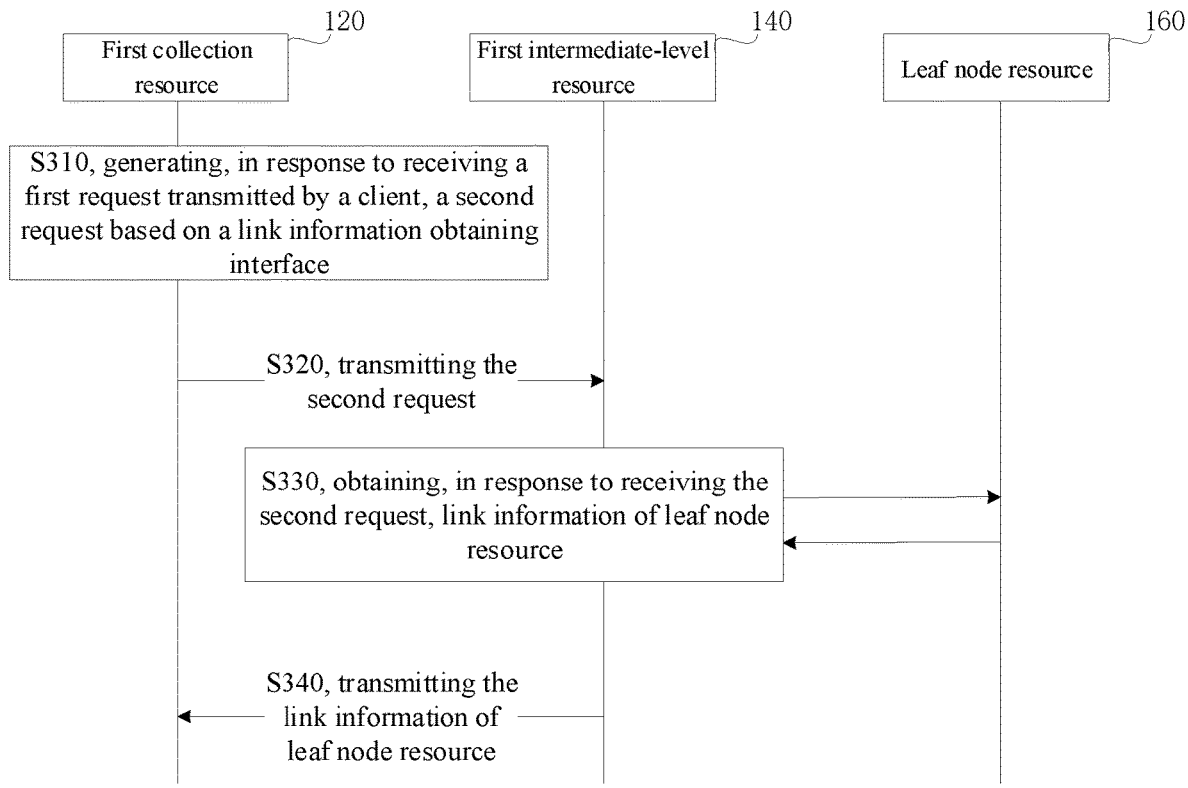
FIG. 3 is a diagram illustrating an architecture of a system for changing a resource state according to an embodiment of the present disclosure.

FIG. 3 is a diagram illustrating an architecture of a system for changing a resource state according to an embodiment of the present disclosure. Referring to FIG. 3, the system for changing the resource state includes the first collection resource 120, the first intermediate-level resource 140, and the leaf node resource 160. When the system for changing the resource state receives an instruction transmitted by a client, the system is triggered to perform an operation of changing the resource state. The details are as follows.

At block 310, when receiving a first request transmitted by a client, the first collection resource generates a second request based on a link information obtaining interface.

In an embodiment of the present disclosure, the first collection resource may be a collection resource that includes a plurality of first intermediate-level resources. In an embodiment of the present disclosure, the first collection resource may be a physical device or a thing that links to a plurality of subordinate resources, e.g., a family resource in the smart home system. The family resource as a whole is one first collection resource.

It should be noted that the first collection resource can receive the first request transmitted by the client. In an embodiment, the first request transmitted by the client may be a request generated by the client under an operation of a user, and the request may be the batch operation request. When receiving the first request transmitted by the client, the first collection resource generates the second request based on the link information obtaining interface. The client may be an application installed in the terminal. The terminal includes but is not limited to any one of a mobile phone, a tablet computer, a smart gateway, a personal computer, a wearable device, and a vehicle-mounted terminal.

In an embodiment, the client and the first collection resource are in the same local area network. The client transmits the first request to the smart gateway. The smart gateway forwards the first request to the first collection resource.

In an embodiment, the client is connected to the first collection resource through short-range wireless communication. The client directly transmits the first request to the first collection resource.

In an embodiment, the client is connected to the first collection resource through a server. The client transmits the first request to the server. The server forwards the first request to the first collection resource.

For the link information obtaining interface, the present disclosure provides but is not limited to the following embodiments.

In an embodiment, the link information obtaining interface is the oic.if.ll interface, and the second request carries an identifier of the oic.if.ll interface. When the oic.if.ll interface is invoked, the interface can obtain link information of all linked resources in a corresponding collection resource. In at least one embodiment, when the link information obtaining interface is the oic.if.ll interface, corresponding resources are invoked recursively until link information of each leaf node resource in the collection resource corresponding to the oic.if.ll interface and link information of each linked collection resource are obtained.

In an embodiment, the link information obtaining interface is the oic.if.bll interface newly defined according to an embodiment of the present disclosure, and the second request carries the identifier of the interface. In at least one embodiment, the oic.if.bll interface is configured to recursively invoke a corresponding collection resource until link information of each linked leaf node resource in the collection resource and the link information of each linked collection resource are obtained. For example, if the oic.if.bll interface is an interface invoked by the first collection resource as illustrated in FIG. 2, the interface can obtain link information of each of the first intermediate-level resource 142, the first intermediate-level resource 144, the second intermediate-level resource 146, the second intermediate-level resource 148, the leaf node resource 162, the leaf node resource 164, the leaf node resource 166, and the leaf node resource 168 at one time.

At block 320, the first collection resource transmits the second request to the first intermediate-level resource.

In an embodiment, after the second request is generated by the first collection resource, the second request will be transmitted to the first intermediate-level resource. The first collection resource may transmit the second request through an established communication link with the first intermediate-level resource.

In an embodiment, when the first collection resource is directly linked to one or more leaf node resources, the first collection resource will transmit the second request to the one or more directly linked leaf node resources. Correspondingly, in this scenario, the second request will directly instruct each of the one or more leaf node resources to perform a state change operation.

At block 330, when receiving the second request, the first intermediate-level resource obtains link information of the leaf node resource.

In an embodiment, as another execution subject, the first intermediate-level resource can parse information carried in the second request after receiving the second request, and obtain the link information of the leaf node resource under an instruction of the second request.

In an embodiment, the leaf node resource is a resource to which the first intermediate-level resource is directly linked.

In an embodiment, the leaf node resource is a resource to which the first intermediate-level resource is linked in a nested manner.

It should be noted that during execution of the embodiment, the second request can also be used to obtain the link information of a collection resource to which the first intermediate-level resource is linked directly, or linked in a nested manner, and this embodiment of the present disclosure is not limited in this regard.

At block 340, the first intermediate-level resource transmits the link information of the leaf node resource to the first collection resource.

In an embodiment, when the first intermediate-level resource obtains the link information of the leaf node resource, the first intermediate-level resource transmits the link information to the first collection resource.

In an embodiment, each of the operation of obtaining the link information of the leaf node resource and the operation of returning the link information to the first collection resource performed by the first intermediate-level resource may be completed under the instruction of the second request. That is, the second request is used to instruct the first intermediate-level resource to obtain and return the link information of the leaf node resource.

At block 350, the first collection resource generates a third request based on the link information of the leaf node resource.

In an embodiment of the present disclosure, the third request includes a state change interface, which is a default interface of the leaf node resource and is configured to change a state of the leaf node resource.

In an embodiment, the first collection resource can obtain an interface list from the link information of the leaf node resource. The interface list is a collection of interfaces that the leaf node resource can support. The interface list includes the default interface of the leaf node resource. That is, the first collection resource can obtain the default interface of the leaf node resource based on the link information of the leaf node resource, and generate the third request. The third request includes the state change interface. The state change interface is the default interface of the leaf node resource. In addition, the third request is used to change the state of the leaf node resource.

At block 360, the first collection resource transmits the third request to the leaf node resource.

In an embodiment of the present disclosure, the first collection resource transmits the third request to the leaf node resource.

Correspondingly, when the leaf node resource receives the third request, a corresponding interface will be invoked by the leaf node resource based on an identifier of the state change interface (i.e., the default interface of the leaf node resource) carried in the third request. In an embodiment of the present disclosure, the leaf node resource invokes its own default interface to change the state of the leaf node resource.

It should be noted that the meaning of changing the state of the leaf node resource according to an embodiment of the present disclosure may include the following scenarios.

Scenario 1: when a current working state of the leaf node resource is different from a working state indicated by the third request, the current working state of the leaf node resource is changed to the working state indicated by the third request.

For example, the leaf node resource is a smart lamp resource, a current working state of the smart lamp resource is an ON state, and a state indicated by the third request is an OFF state. In this scenario, the leaf node resource changes the working state of the smart lamp resource to the OFF state based on the third request.

Scenario 2: when the current working state of the leaf node resource is the same as the working state indicated by the third request, the current working state of the leaf node resource is kept unchanged. In at least one embodiment, the leaf node resource may also return a message indicating success of the change to the first intermediate-level resource.

In summary, the system for changing the resource state according to an embodiment of the present disclosure includes the first collection resource, the first intermediate-level resource, and the leaf node resources. The first collection resource can generate, in response to receiving the first request transmitted by the client, the second request based on the link information obtaining interface, and transmit the second request to the first intermediate-level resource. The first intermediate-level resource obtains the link information of each leaf node resource based on the received second request, and returns the link information to the first collection resource. The first collection resource then determines the default interface of each leaf node resource based on the link information, and generates the third request, by which the leaf node resource is instructed to change its own state. Thus, the system disclosed by the present disclosure can avoid a problem that the interface invoked in the request is not the default interface of the leaf node and thus cannot be used in a case where the first collection resource directly transmits downwardly a request for controlling the leaf node resource to change the state. In this way, the interface invoked by the request generated by the first collection resource is the default interface of the leaf node resource, and thus, the first collection resource can successfully change the states of all leaf node resources in the system at one time.

Figure 4:
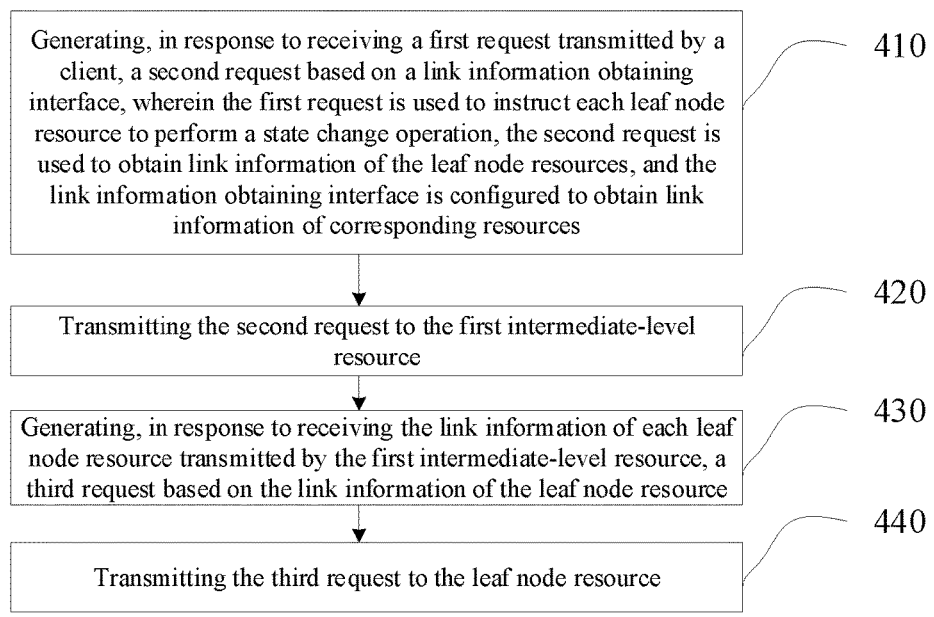
FIG. 4 is a flowchart illustrating a method for changing a resource state according to an embodiment of the present disclosure.

FIG. 4 is a flowchart illustrating a method for changing a resource state according to an embodiment of the present disclosure. The method illustrated in FIG. 4 can be applied in a first collection resource. The first collection resource includes a first intermediate-level resource. The first intermediate-level resource includes leaf node resources. The method includes the following.

At block 410, when a first request transmitted by a client is received, a second request is generated based on a link information obtaining interface. The first request is used to instruct each leaf node resource to perform a state change operation. The second request is used to obtain link information of the leaf node resource. The link information obtaining interface is configured to obtain link information of corresponding resources.

In an embodiment of the present disclosure, the first collection resource will generate, in response to receiving the first request transmitted by the client, the second request based on the link information obtaining interface. It should be noted that the first request transmitted by the client is used to instruct each leaf node resource to perform the state change operation. The second request generated by the first collection resource is used to obtain the link information of the leaf node resource. The link information obtaining interface is configured to obtain the link information of the corresponding resources. Regarding resources corresponding to the link information obtaining interface, embodiments include but are not limited to the following two resource correspondence schemes.

In at least one embodiment, in a viable implementation, the link information of each leaf node resource includes at least one of a resource identifier, an interface type, port information, and a resource type.

In an embodiment, the resources corresponding to the link information obtaining interface include: one or more resources processed by the link information obtaining interface, and one or more leaf node resources to which each of the one or more resources is directly linked.

For example, when the link relationship between the first collection resource, the first intermediate-level resources, and the leaf node resources is consistent with the relationship illustrated in FIG. 1, the resources corresponding to the link information obtaining interface may include one or more resources processed by the link information obtaining interface, i.e., the intermediate-level resources 140 illustrated in FIG. 1, and leaf node resources directly linked to the first intermediate-level resources, i.e., the leaf node resources 160 illustrated in FIG. 1.

It should be noted that such a link manner can deal with, in the architecture, a batch operation for a structure of first collection resource—first intermediate-level resource(s)—leaf node resource(s), in which the intermediate-level resource(s) and the leaf node resource(s) are directly linked to each other. Since the above link structure is widely used in the field of smart home, the correspondence manner between resources and the link information obtaining interface according to the embodiment can solve a problem in the field, which is to cope with a failure in batch processing for the first collection resource.

In at least one embodiment, in such a processing manner, the link information obtaining interface can be designed as the oic.if.ll interface.

In another embodiment, the resources corresponding to the link information obtaining interface include: one or more resources processed by the link information obtaining interface, and one or more leaf node resources to which each of the one or more resources is linked in a nested manner.

For example, when the link relationship between the first collection resource, the first intermediate-level resources, and the leaf node resources is consistent with the relationship illustrated in FIG. 2, the resources corresponding to the link information obtaining interface may include the resources processed by the link information obtaining interface, i.e., the intermediate-level resource 142 and the intermediate-level resource 144 illustrated in FIG. 2, and the leaf node resources linked to the first intermediate-level resources in a nested manner, i.e., the leaf node resource 162, the leaf node resource 164, the leaf node resource 166, and the leaf node resource 168 illustrated in FIG. 2.

At block 420, the second request is transmitted to a first intermediate-level resource.

In an embodiment, the first collection resource transmits the second request to the first intermediate-level resource.

At block 430, when link information of each leaf node resource transmitted by the first intermediate-level resource is received, a third request is generated based on the link information of the leaf node resource.

In the present disclosure, the first collection resource may generate, in response to receiving the link information of each leaf node resource transmitted by the first intermediate-level resource, the third request based on the link information. The third request includes the state change interface. The state change interface is the default interface of the leaf node resource and is configured to change the state of the leaf node resource.

At block 440, the third request is transmitted to the leaf node resource.

In the present disclosure, the first collection resource transmits the third request to the leaf node resource.

Correspondingly, when receiving the third request, the leaf node resource will invoke a corresponding interface in accordance with the identifier of the state change interface (i.e., the default interface of the leaf node resource) carried in the third request. In an embodiment of the present disclosure, the leaf node resource invokes its own default interface to change the state of the leaf node resource.

In an embodiment, the first collection resource can perform centralized management of leaf node resources by generating a second collection resource. In a step of generating the second collection resource, the first collection resource can also correspondingly transmit the third request to each leaf node resource through the second collection resource.

In the above scenario, when the link information of the leaf node resource transmitted by the first intermediate-level resource is received, the first collection resource generates the second collection resource. It should be noted that the second collection resource may also be a pre-generated collection resource. The second collection resource is directly linked to one or more leaf node resources. The first collection resource generates, through the second collection resource, the third request based on the link information of the one or more leaf node resources. The first collection resource transmits the third request to each of the one or more leaf node resources through the second collection resource.

In summary, with the method for changing the resource state according to an embodiment of the present disclosure, the first collection resource can obtain the link information of each linked leaf node resource from the first intermediate-level resource after receiving the first request transmitted by the client, and generate a request to be transmitted to the leaf node resource based on the link information. In this way, an interface identifier in the transmitted request is consistent with the default interface of the leaf node resource, thereby improving performance of the first collection resource in processing a batch of leaf node resources, improving a success rate of system control, and helping the system execute instructions correctly.

Figure 5:
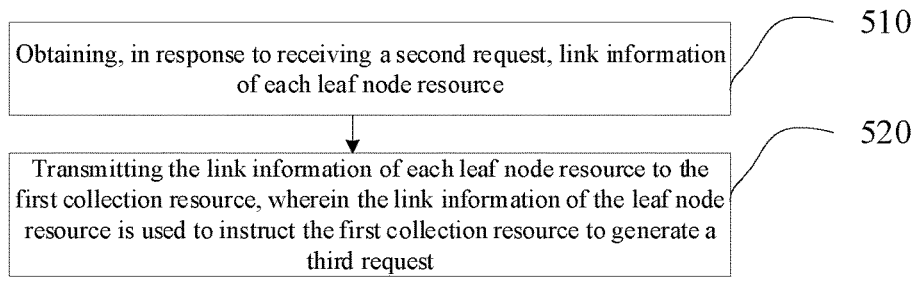
FIG. 5 is a flowchart illustrating another method for changing a resource state according to an embodiment of the present disclosure.

FIG. 5 is a flowchart illustrating another method for changing a resource state according to an embodiment of the present disclosure. The method illustrated in FIG. 5 can be applied in a first intermediate-level resource. A first collection resource includes the first intermediate-level resource. The first intermediate-level resource includes leaf node resources. The method includes the following.

At block 510, when a second request is received, link information of each leaf node resource is obtained.

In an embodiment, the first intermediate-level resource can obtain the link information of the leaf node resource when receiving the second request. It should be noted that the second request is a request generated based on the link information obtaining interface when the first collection resource receives the first request transmitted by a client. The link information obtaining interface is configured to obtain the link information of the resources corresponding to the link information obtaining interface.

In an embodiment, the first intermediate-level resource can parse out an instruction in the second request, such that the first intermediate-level resource obtains the link information of the leaf node resource based on the instruction of the second request.

In an embodiment, the first intermediate-level resource can determine how to obtain the link information of the leaf node resource based on a condition of the resources corresponding to the link information obtaining interface.

In an embodiment, the resources corresponding to the link information obtaining interface include: one or more resources processed by the link information obtaining interface, and one or more leaf node resources to which each of the one or more resources is directly linked.

In this scenario, when the second request is received, the first intermediate-level resource can obtain the link information of the one or more leaf node resources directly linked to the first intermediate-level resource.

In another embodiment, the resources corresponding to the link information obtaining interface includes: one or more resources processed by the link information obtaining interface, and one or more leaf node resources to which each of the one or more resources is linked in a nested manner.

In this scenario, when the second request is received, the first intermediate-level resource can obtain first sub-link information indicating link information of each leaf node resource to which the first intermediate-level resource is directly linked. Subsequently, the first intermediate-level resource can obtain second sub-link information indicating link information of each leaf node resource to which the first intermediate-level resource is linked in a nested manner.

Taking the architecture illustrated in FIG. 2 according to an embodiment as an example, description is made by way of example with respect to the first intermediate-level resource 142. When the second request is received, the first intermediate-level resource can obtain the first sub-link information. The first sub-link information is used to indicate each leaf node resource to which the first intermediate-level resource 142 is directly linked. Since the first intermediate-level resource 142 is not directly linked to any leaf node resource in FIG. 2, the first sub-link information is empty. The first intermediate-level resource 142 can also obtain the second sub-link information. The second sub-link information is used to indicate the link information of the leaf node resource 162 and the link information of the leaf node resource 164 to which the first intermediate-level resource 142 is linked in a nested manner.

At block 520, the link information of the leaf node resource is transmitted to the first collection resource. The link information of the leaf node resource is used to instruct the first collection resource to generate a third request.

In an embodiment, the first intermediate-level resource can transmit the link information of the leaf node resource to the first collection resource. The link information of the leaf node resource is used to instruct the first collection resource to generate the third request. The third request includes the state change interface. The state change interface is the default interface of the leaf node resource and is configured to change the state of leaf node resource.

In summary, with the method for changing the resource state according to an embodiment, the first intermediate-level resource is enabled to return the link information of each linked leaf node resource to the first collection resource when receiving the second request transmitted by the first collection resource, and provides accurate link information of the leaf node resource to the first collection resource, such that the first collection resource can correctly control a state change of each leaf node resource at one time. Since the first intermediate-level resource provides the accurate link information of the leaf node resource, an effect of accurately controlling the leaf node resources in batch by the first collection resource is improved.

Figure 6:
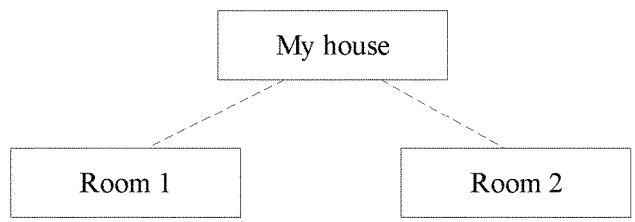
FIG. 6 is a schematic diagram illustrating a model in a smart home system according to an embodiment of the present disclosure.

FIG. 6 is a schematic diagram illustrating a model in a smart home system according to an embodiment of the present disclosure. Referring to FIG. 6, there is illustrated a first collection resource as my house, a first intermediate-level resource as my room 1, and a first intermediate-level resource as my room 2. My room 1 includes leaf node resources as light 1 and light 2. My room 2 includes leaf node resources as light 3 and light 4.

In an embodiment, exemplary codes related to the first collection resource—my house are as follows.

```
/myhouse{              //representing the first collection resource:
myhouse
"rt":["x.org.example.house", "oic.wk.col],   //rt(resource type), type
description of the first collection resource--myhouse
"if":["oic.if.ll", "oic.if.baseline", "oic.if.b", "oic.if.lrw"]]  //if (interface),
describing interface types supported by each resource, the first of which
is the default interface
"links":       //used to describe content of each resource linked to the first
collection resource
[
{,,,"
{
"href": "/myroom1",   //used to describe path information of the resource
my room 1 linked to the first collection resource
"rt": "x.org.example.room,oic.wk.col",   //used to describe the resource
type of the resource my room 1
"if":["oic.ifb", "oic.if.baseline", "oic.if.ll"],  //used to describe the
interface type of the resource my room 1
"bm":2}
{
"href": "/myroom2",
"rt": "x.org.example.room,oic.if.ll.baseline",
"if":["oic.if.ll", "oic.if.baseline", "oic.ifb"],
"bm":2}
]
}
```

It should be noted that for code comments on the resource my room 2 reference may be made to code comments on the resource my room 1, and thus description of the code comments on the resource my room 2 will not be repeated here.

In an embodiment, for detailed code representations of the resource my room 1, reference can be made to the following content.

```
/myroom1{
"rt":["x.org.example.room", "oic.wk.col",
"if":[ "oic.if.b", "oic.if.baseline", "oic,if,ll"],
"links":
[
{
"href": "/light1",
"rel":["item"],
"rt": "oic.r.switch.binary",
"if":[ "oic.if.a", "oic.if.baseline"],
"bm":2}
{
"href": "/light2",
"rel":["item"],
"rt": "oic.r.switch.binary",
"if":[ "oic.if.a", "oic.if.baseline"],
"bm":2}
]
}
```

In an embodiment, for detailed code representations of the resource my room 2, reference can be made to the following content.

```
/myroom1{
"rt":["x.org.example.room", "oic.wk.col",
"if":[ "oic.if.ll", "oic.if.baseline", "oic,if,b"],
"links":
[
{
"href": "/light3",
"rel":["item"],
"rt": "oic.r.switch.binary",
"if":[ "oic.if. a", "oic.if.baseline"],
"bm":2}
{
"href": "/light4",
"rel":["item"],
"rt": "oic.r.switch.binary",
"if":[ "oic.if. a", "oic.if.baseline"],
"bm":2}
]
}
```

It should be noted that reference can be made to the comments on the code representations of the first collection resource for comments on the code representations of the resource my room 1 and the code representations of the resource my room 2, which will not be repeated here.

Figure 7:
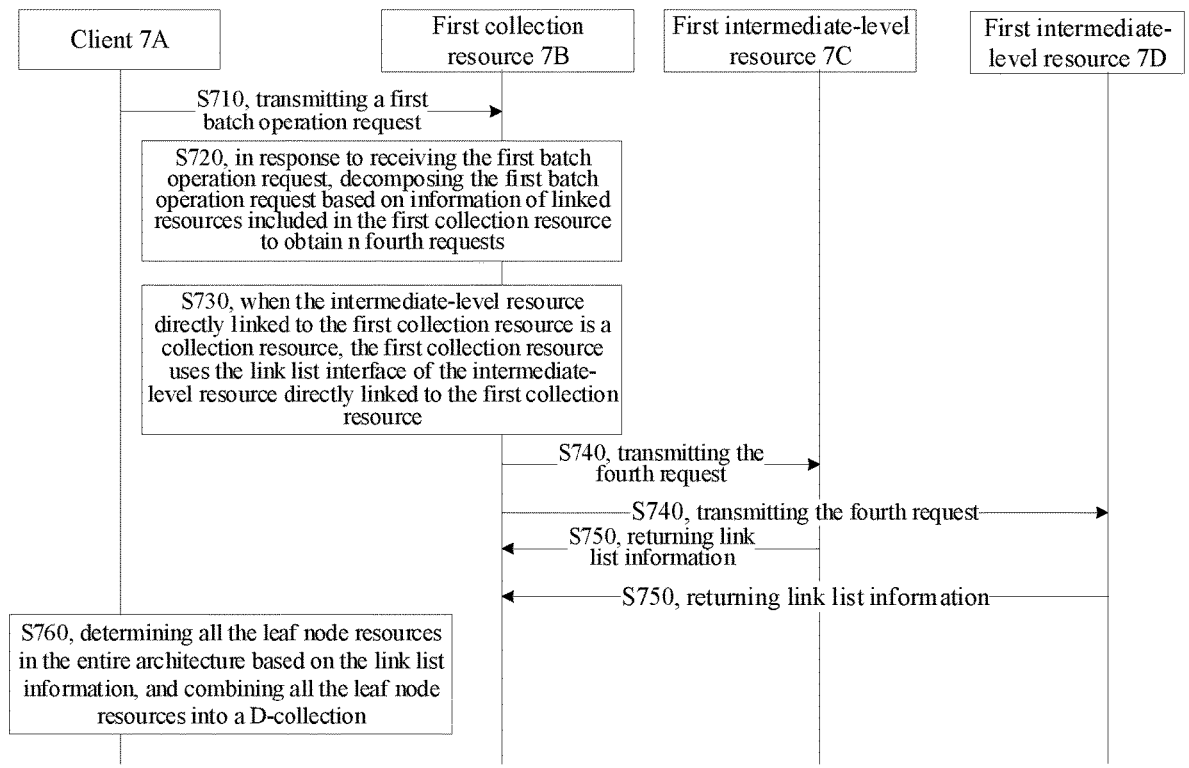
FIG. 7 is an interaction diagram of an application scenario for changing a resource state according to an embodiment of the present disclosure.

FIG. 7 is an interaction diagram of an application scenario for changing a resource state according to an embodiment of the present disclosure. FIG. 7 includes a client 7A, a first collection resource 7B, a first intermediate-level resource 7C, and a first intermediate-level resource 7D.

At block 710, the client transmits a first batch operation request to the first collection resource.

At block 720, when receiving the first batch operation request, the first collection resource decomposes the first batch operation request based on information of linked resources included in the first collection resource to obtain n fourth requests.

It should be noted that n is a positive integer, and n is a number of first intermediate-level resources directly linked to the first collection resource.

In an embodiment, the first collection resource may be a T-collection.

At block 730, when the first intermediate-level resource directly linked to the first collection resource is a collection resource, the first collection resource uses the link list interface (i.e., oic.if.ll interface) of the first intermediate-level resource directly linked to the first collection resource.

At block 740, the first collection resource transmits the fourth requests to the first intermediate-level resources.

At block 750, the first intermediate-level resources return link list information to the first collection resource.

At block 760, the first collection resource determines all the leaf node resources in the entire architecture based on the link list information, and combines all the leaf node resources into a D-collection.

In at least one embodiment, after block 760, the first collection resource may perform the following operations.

In operation (1), the first collection resource will decompose the first batch operation request into fifth requests again based on the D-collection, and transmit the fifth requests to respective leaf node resources included in the D-collection.

It should be noted that an interface of each fifth request is the default interface corresponding to a respective leaf node resource included in the D-collection. The fifth requests are used to be transmitted to respective leaf node resources included in the D-collection.

In an embodiment, instead of generating the D-collection, the first collection resource may transmit the fifth requests to respective leaf node resources in the entire architecture.

In operation (2), the first collection resource obtains a response message returned by each leaf node resource included in the D-collection, and aggregates the response messages to obtain a response message for the first batch operation request.

In operation (3), the first collection resource returns the response message for the first batch operation request to the client.

In an embodiment of the present disclosure, the client uses a batch operation request to operate the T-collection. T-collection is a resource that contains other first intermediate-level resources. After receiving the above batch operation request, T-collection generates fourth requests based on information of other collection resources linked to itself, transmits the fourth requests correspondingly to the other linked collection resources (i.e., the first intermediate-level resources), and determines the link list (i.e., oic.if.ll) interface as the interface type of each fourth request. T-collection (i.e., the first collection resource 7B in FIG. 7) directly links to the first intermediate-level resource 7C and the first intermediate-level resource 7D.

In the above operation, after receiving the fourth requests, the first intermediate-level resource 7C and the first intermediate-level resource 7D each return link information of respective leaf node resources of the first intermediate-level resource 7C and the first intermediate-level resource 7D. The link information includes a resource identifier, an interface type, port information, and/or a resource type.

In the above operation, the T-collection generates a new D-collection based on the respective leaf node resources returned by the first intermediate-level resource 7C and the first intermediate-level resource 7D. It should be noted that D-collection is a virtual temporary collection resource. After the first batch operation request is processed, the D-collection will be deleted. In an embodiment, D-collection directly links to all leaf node resources returned by the first intermediate-level resource 7C and all leaf node resources returned by the first intermediate-level resource 7D.

In summary, the above solution according to an embodiment can solve a problem that the states of the leaf node resources cannot be changed correctly in a batch operation for a resource structure of first collection resource—first intermediate-level resource(s)—leaf node resource(s). Since in the field of smart home, the above nested manner of first collection resource—first intermediate-level resource(s)— leaf node resource(s) is most commonly applied, there is no need to define a new interface in this solution, which is thus easy to implement.

In another embodiment, a new interface oic.if.bll can be designed in the system for changing the resource state, and a function of the interface is similar to that of the oic.if.b interface. The interface oic.if.bll designed by the present disclosure needs to be supported by each resource in the system for changing the resource state. The resources include a first collection resource, one or more first intermediate-level resource, and leaf node resources. The oic.if.bll interface is configured to obtain all first intermediate-level resources and leaf node resources to which the first collection resource is linked in a nested manner at one time.

Figure 8:
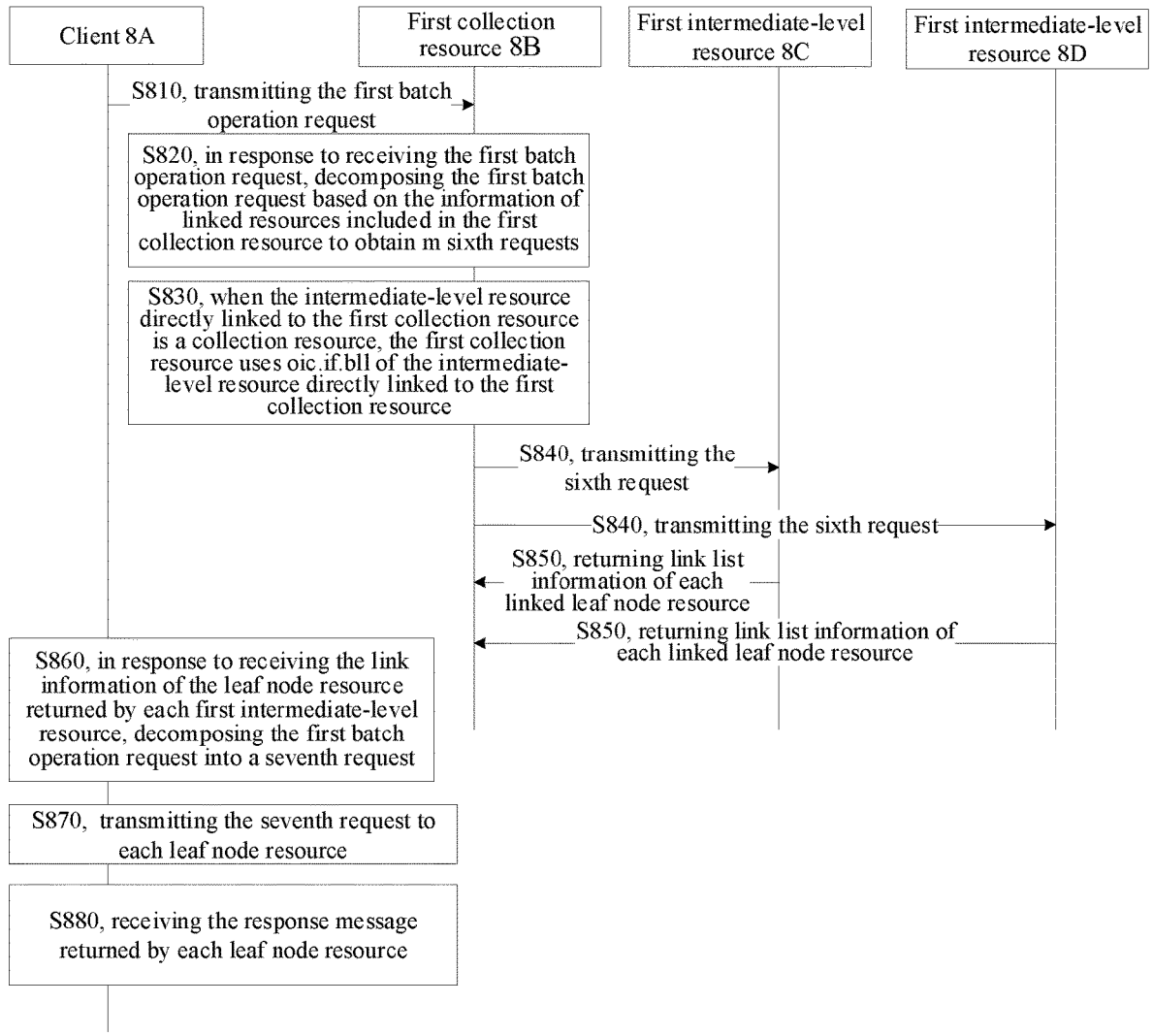
FIG. 8 is an interaction diagram of another application scenario for changing a resource state according to an embodiment of the present disclosure.

FIG. 8 is an interaction diagram of another application scenario for changing a resource state according to an embodiment of the present disclosure. FIG. 8 includes a client 8A, a first collection resource 8B, a first intermediate-level resource 8C, and a first intermediate-level resource 8D.

At block 810, the client transmits a first batch operation request to the first collection resource.

At block 820, when receiving the first batch operation request, the first collection resource decomposes the first batch operation request based on the information of linked resources included in the first collection resource to obtain m sixth requests.

It should be noted that m is a positive integer, and m is a number of first intermediate-level resources directly linked to the first collection resource.

In an embodiment, the first collection resource may be a T-collection. When the T-collection receives the first batch operation request, the T-collection decomposes the first batch operation request based on a number of first intermediate-level resources directly linked to the T-collection, and obtains m sixth requests.

At block 830, when the first intermediate-level resource directly linked to the first collection resource is a collection resource, the first collection resource uses oic.if.bll of the first intermediate-level resource directly linked to the first collection resource.

At block 840, the first collection resource transmits the sixth requests to the first intermediate-level resources.

In an embodiment of the present disclosure, the interface invoked by the sixth request is oic.if.bll.

It should be noted that after the first intermediate-level resource receives the sixth request, the first intermediate-level resource will continue generating a request that invokes oic.if.bll when the first intermediate-level resource directly links to another first intermediate-level resource, and transmits the request to the other first intermediate-level resource that is directly linked to the first intermediate-level resource.

At block 850, when the first intermediate-level resource is no longer linked to another first intermediate-level resource, the first intermediate-level resource returns the link information of each directly linked leaf node resource to the first collection resource.

At block 860, when receiving the link information of each leaf node resource returned by each first intermediate-level resource, the first collection resource decomposes the first batch operation request into seventh requests.

In at least one embodiment, the first collection resource can also generate a D-collection. The D-collection is a virtual temporary collection resource. The D-collection will be deleted after a process of changing the resource state according to the embodiment is executed. It should be noted that the D-collection directly links to all leaf node resources in this embodiment.

At block 870, the first collection resource transmits the seventh requests to the leaf node resources correspondingly.

It should be noted that when the seventh request is transmitted to each leaf node resource, the interface carried is the default interface of the corresponding leaf node resource.

At block 880, the first collection resource receives the response message returned by each leaf node resource.

In at least one embodiment, the first collection resource may also aggregate respective response messages returned by each leaf node.

In summary, with the newly defined batch link list interface according to an embodiment of the present disclosure, when there is a multi-level nesting relationship in the system, the first collection resource can obtain the link information of all the leaf node resources level by level according to the batch link list interface. After obtaining the link information, the first collection resource can decompose batch information transmitted by the client into information that invokes the default interface of each leaf node resource, thereby realizing an effect of changing the state of each leaf node resource in the entire system at one time.

Figure 9:
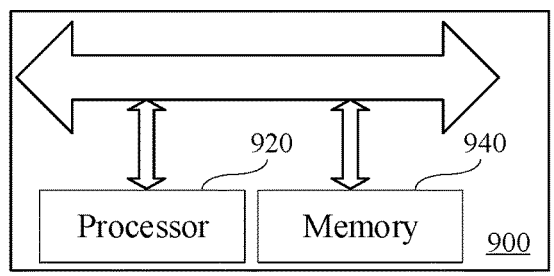
FIG. 9 is a block diagram showing a structure of a terminal according to an exemplary embodiment of the present disclosure.

FIG. 9 is a block diagram showing a structure of a terminal according to an exemplary embodiment of the present disclosure. The terminal illustrated in FIG. 9 can be identified as the first collection resource, or can be identified as the first intermediate-level resource in the system. As illustrated in FIG. 9, the terminal includes a processor 920 and a memory 940. The memory 940 stores at least one instruction. The at least one instruction is loaded and executed by the processor 920 to perform the method for changing the resource state as described in various method embodiments of the present disclosure.

In the present disclosure, the terminal 900 is an electronic device having a communication function.

The processor 920 may include one or more processing cores. The processor 920 uses various interfaces and lines to connect to various parts of the entire terminal 900, and executes various functions of the terminal 900 and processes data by running or executing instructions, programs, code sets, or instruction sets stored in the memory 940 and retrieving data stored in the memory 940. In at least one embodiment, the processor 920 may be implemented by at least one hardware form of a Digital Signal Processing (DSP), a Field-Programmable Gate Array (FPGA), and a Programmable Logic Array (PLA). The processor 920 may be integrated with one or any combination of a Central Processing Unit (CPU), a Graphics Processing Unit (GPU), and a modem. The CPU mainly processes an operating system, a user interface, applications and so on. The GPU is configured to render and draw content that needs to be displayed on a display. The modem is configured to process wireless communication. It can be understood that the above modem may not be integrated into the processor 920, but may be implemented by a chip alone.

The memory 940 may include a Random Access Memory (RAM), or may include a Read-Only Memory. In at least one embodiment, the memory 940 includes a non-transitory computer-readable storage medium. The memory 940 may be configured to store instructions, programs, codes, code sets or instruction sets. The memory 940 may include a program storage region and a data storage region. The program storage region may store instructions for implementing the operating system, instructions for at least one function (such as a touch function, a sound playback function, an image playback function, etc.), and instructions used to implement the following method embodiments. The data storage region can store data involved in the following method embodiments.

The following are apparatus embodiments of the present disclosure, which can be configured to implement the method embodiments of the present disclosure. For details that are not disclosed in the apparatus embodiments of the present disclosure, reference may be made to the method embodiments of the present disclosure.

Figure 10:
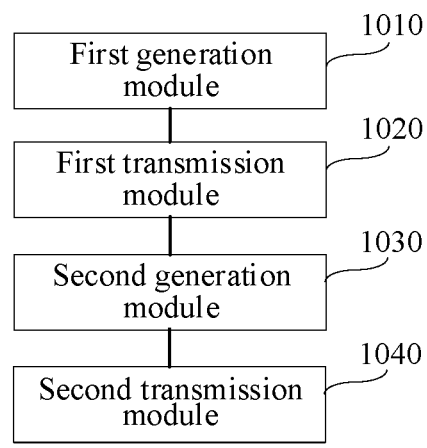
FIG. 10 is a block diagram showing a structure of an apparatus for changing a resource state according to an exemplary embodiment of the present disclosure.

FIG. 10 is a block diagram showing a structure of an apparatus for changing a resource state according to an exemplary embodiment of the present disclosure. Referring to FIG. 10, the apparatus for changing the resource state can be implemented as all or a part of the terminal through software, hardware or a combination of the software and the hardware, so as to realize a function of the first collection resource. In the apparatus, the first collection resource includes the first intermediate-level resource, and the first intermediate-level resource includes the leaf node resources. The apparatus includes a first generation module 1010, a first transmission module 1020, a second generation module 1030, and a second transmission module 1040.

The first generation module 1010 is configured to generate, in response to receiving a first request transmitted by a client, a second request based on a link information obtaining interface. The first request is used to instruct each leaf node resource to perform a state change operation. The second request is used to obtain link information of the leaf node resources. The link information obtaining interface is configured to obtain link information of resources corresponding to the link information obtaining interface.

The first transmission module 1020 is configured to transmit the second request to the first intermediate-level resource.

The second generation module 1030 is configured to generate, in response to receiving the link information of each leaf node resource transmitted by the first intermediate-level resource, a third request based on the link information of the leaf node resource. The third request includes a state change interface which is a default interface of the leaf node resource and is configured to change the state of the leaf node resource.

The second transmission module 1040 is configured to transmit the third request to the leaf node resource.

In at least one embodiment, the resources corresponding to the link information obtaining interface involved in the apparatus include: one or more resources processed by the link information obtaining interface, and one or more leaf node resources to which each of the one or more resources is directly linked.

In at least one embodiment, the resources corresponding to the link information obtaining interface involved in the apparatus include: one or more resources processed by the link information obtaining interface, and one or more leaf node resources to which each of the one or more resources is linked in a nested manner.

In at least one embodiment, the second generation module 1030 is configured to generate, in response to receiving the link information of each leaf node resource transmitted by the first intermediate-level resource, a second collection resource directly linked to the leaf node resource.

In at least one embodiment, the second transmission module 1040 is configured to transmit the third request to the leaf node resource through the second collection resource.

In at least one embodiment, the link information of each leaf node resource involved in the apparatus includes at least one of a resource identifier, an interface type, port information, and a resource type.

Figure 11:
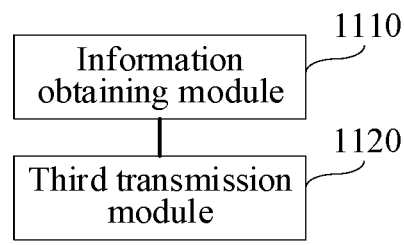
FIG. 11 is a block diagram showing a structure of an apparatus for changing a resource state according to an exemplary embodiment of the present disclosure.

FIG. 11 is a block diagram showing a structure of an apparatus for changing a resource state according to an exemplary embodiment of the present disclosure. Referring to FIG. 11, the apparatus for changing the resource state can be implemented as all or a part of the terminal through software, hardware, or a combination of the software and the hardware, so as to realize a function of the first intermediate-level resource. In the apparatus, the first collection resource includes the first intermediate-level resource. The first intermediate-level resource includes the leaf node resources. The apparatus includes an information obtaining module 1110 and a third transmission module 1120.

The information obtaining module 1110 is configured to obtain, in response to receiving a second request, link information of each leaf node resource. The second request is generated by the first collection resource based on a link information obtaining interface in response to receiving a first request transmitted by a client. The link information obtaining interface is configured to obtain link information of resources corresponding to the link information obtaining interface.

The third transmission module 1120 is configured to transmit the link information of each leaf node resource to the first collection resource. The link information of the leaf node resource is used to instruct the first collection resource to generate a third request. The third request includes a state change interface which is a default interface of the leaf node resource and is configured to change a state of the leaf node resource.

In at least one embodiment, the resources corresponding to the link information obtaining interface involved in the apparatus include: one or more resources processed by the link information obtaining interface, and one or more leaf node resources to which each of the one or more resources is directly linked.

In at least one embodiment, the resources corresponding to the link information obtaining interface involved in the apparatus include: one or more resources processed by the link information obtaining interface, and one or more leaf node resources to which each of the one or more resources is linked in a nested manner.

In at least one embodiment, the information obtaining module 1110 is configured to obtain, in response to receiving the second request, link information of each leaf node resource to which the first intermediate-level resource is directly linked.

In at least one embodiment, the information obtaining module 1110 is configured to: obtain, in response to receiving the second request, first sub-link information indicating link information of each leaf node resource to which the first intermediate-level resource is directly linked; and obtain second sub-link information indicating link information of each leaf node resource to which the first intermediate-level resource is linked in a nested manner.

An embodiment of the present disclosure also provides a computer-readable medium having at least one instruction stored thereon. The at least one instruction is loaded and executed by a processor to perform the method for changing the resource state as described in the above embodiments.

It should be noted that when the apparatus for changing the resource state according to the above embodiments executes the method for changing the resource state, the division of the above functional modules is only used as an example for illustration. In practical applications, the above functions may be allocated to be implemented by different functional modules according to practical requirements. That is, an internal structure of a device is divided into different functional modules to complete all or part of the functions described above. In addition, a concept of the apparatus for changing the resource state according to the above embodiments is identical to that of the embodiments of the method for changing the resource state. For a specific implementation process, reference may be made to the method embodiments, and thus the description thereof will be omitted here.

Serial numbers in the above embodiments of the present disclosure are only for description, and do not represent advantages and disadvantages of the embodiments.

Those skilled in the art can understand that all or part of the steps in the above embodiments can be completed by hardware, or by relevant hardware instructed by a program. The program can be stored in a computer-readable storage medium. The storage medium mentioned above may be a ROM, a magnetic disk, an optical disk, or the like.

The above description is only embodiments of the present disclosure, and is not intended to limit the present disclosure. Any modification, equivalent replacement, improvement, or the like made within the spirit and principle of the present disclosure shall be included in the scope of the present disclosure.

What is claimed is:

1. A method for changing a resource state, applied in a first collection resource, wherein the first collection resource is directly linked to a first intermediate-level resource and directly linked to n1 leaf node resources, and the first intermediate-level resource is linked to m second intermediate-level resources and linked to n−n1 leaf node resources, where m is a natural number, n is a positive integer, and n1 is a natural number not greater than n, the method comprising:
    generating, by the first collection resource in response to receiving a first request transmitted by a client, a second request based on a link information obtaining interface, wherein the first request is used to instruct each leaf node resource to perform a state change operation, the second request is used to obtain link information of the leaf node resources, and the link information obtaining interface is configured to obtain link information of resources corresponding to the link information obtaining interface;
    transmitting, by the first collection resource, the second request to the first intermediate-level resource;
    generating, by the first collection resource, in response to receiving the link information of each leaf node resource transmitted by the first intermediate-level resource, a third request based on the link information of the leaf node resource, wherein the third request comprises a state change interface which is a default interface of the leaf node resource and is configured to change the state of the leaf node resource; and
    transmitting, by the first collection resource, the third request to the leaf node resource.

2. The method according to claim 1, wherein the resources corresponding to the link information obtaining interface comprise: one or more resources processed by the link information obtaining interface, and one or more leaf node resources to which each of the one or more resources is directly linked.

3. The method according to claim 2, wherein said generating, by the first collection resource in response to receiving the link information of each leaf node resource transmitted by the first intermediate-level resource, the third request based on the link information of the leaf node resource comprises:
    generating, by the first collection resource in response to receiving the link information of the leaf node resource transmitted by the first intermediate-level resource, a second collection resource directly linked to the leaf node resource; and
    generating, by the first collection resource through the second collection resource, the third request based on the link information of the leaf node resource, and
    wherein said transmitting, by the first collection resource, the third request to the leaf node resource comprises:
    transmitting, by the first collection resource, the third request to the leaf node resource through the second collection resource.

4. The method according to claim 2, wherein the link information of each leaf node resource comprises at least one of a resource identifier, an interface type, port information, and a resource type.

5. The method according to claim 1, wherein the resources corresponding to the link information obtaining interface comprise: one or more resources processed by the link information obtaining interface, and one or more leaf node resources to which each of the one or more resources is linked in a nested manner.

6. A computer-readable storage medium having at least one instruction stored thereon, wherein the at least one instruction is loaded and executed by a processor to perform the method for changing the resource state according to claim 1.

7. A method for changing a resource state, applied in a first intermediate-level resource, wherein a first collection resource is directly linked to the first intermediate-level resource and directly linked to n1 leaf node resources, and the first intermediate-level resource is linked to m second intermediate-level resources and linked to n−n1 leaf node resources, where m is a natural number, n is a positive integer, and n1 is a natural number not greater than n, the method comprising:
    obtaining, by the first intermediate-level resource in response to receiving a second request, link information of each leaf node resource, wherein the second request is generated by the first collection resource based on a link information obtaining interface in response to receiving a first request transmitted by a client, and the link information obtaining interface is configured to obtain link information of resources corresponding to the link information obtaining interface; and
    transmitting, by the first intermediate-level resource, the link information of each leaf node resource to the first collection resource, wherein the link information of the leaf node resource is used to instruct the first collection resource to generate a third request, and the third request comprises a state change interface which is a default interface of the leaf node resource and is configured to change a state of the leaf node resource.

8. The method according to claim 7, wherein the resources corresponding to the link information obtaining interface comprise: one or more resources processed by the link information obtaining interface, and one or more leaf node resources to which each of the one or more resources is directly linked.

9. The method according to claim 8, wherein said obtaining, by the first intermediate-level resource in response to receiving the second request, the link information of each leaf node resource comprises:

obtaining, by the first intermediate-level resource in response to receiving the second request, link information of each leaf node resource to which the first intermediate-level resource is directly linked.

10. The method according to claim 7, wherein the resources corresponding to the link information obtaining interface comprise: one or more resources processed by the link information obtaining interface, and one or more leaf node resources to which each of the one or more resources is linked in a nested manner.

11. The method according to claim 10, wherein said obtaining, by the first intermediate-level resource in response to receiving the second request, the link information of each leaf node resource comprises:

obtaining, by the first intermediate-level resource in response to receiving the second request, first sub-link information indicating link information of each leaf node resource to which the first intermediate-level resource is directly linked; and obtaining, by the first intermediate-level resource, second sub-link information indicating link information of each leaf node resource to which the first intermediate-level resource is linked in a nested manner.

12. An apparatus, comprising a processor and a memory, wherein the memory stores at least one instruction, and the at least one instruction is loaded and executed by the processor to perform the method for changing the resource state according to claim 7.

13. A computer-readable storage medium having at least one instruction stored thereon, wherein the at least one instruction is loaded and executed by a processor to perform the method for changing the resource state according to claim 7.

14. An apparatus for changing a resource state, applied in a first collection resource, wherein the first collection resource is directly linked to a first intermediate-level resource and directly linked to n1 leaf node resources, and the first intermediate-level resource is linked to m second intermediate-level resources and linked to n–n1 leaf node resources, where m is a natural number, n is a positive integer, and n1 is a natural number not greater than n, the apparatus comprising a processor and a memory, wherein the memory stores at least one instruction, and the at least one instruction is loaded and executed by the processor to perform operations comprising:

generating, by the first collection resource in response to receiving a first request transmitted by a client, a second request based on a link information obtaining interface, wherein the first request is used to instruct each leaf node resource to perform a state change operation, the second request is used to obtain link information of the leaf node resources, and the link information obtaining interface is configured to obtain link information of resources corresponding to the link information obtaining interface;

transmitting, by the first collection resource, the second request to the first intermediate-level resource;

generating, by the first collection resource in response to receiving the link information of each leaf node resource transmitted by the first intermediate-level resource, a third request based on the link information of the leaf node resource, wherein the third request comprises a state change interface which is a default interface of the leaf node resource and is configured to change the state of the leaf node resource; and transmitting, by the first collection resource, the third request to the leaf node resource.

15. The apparatus according to claim 14, wherein the resources corresponding to the link information obtaining interface comprise: one or more resources processed by the link information obtaining interface, and one or more leaf node resources to which each of the one or more resources is directly linked.

16. The apparatus according to claim 15, wherein said generating, by the first collection resource in response to receiving the link information of each leaf node resource transmitted by the first intermediate-level resource, the third request based on the link information of the leaf node resource comprises:

generating, by the first collection resource in response to receiving the link information of the leaf node resource transmitted by the first intermediate-level resource, a second collection resource directly linked to the leaf node resource; and generating, by the first collection resource through the second collection resource, the third request based on the link information of the leaf node resource, and wherein said transmitting, by the first collection resource, the third request to the leaf node resource comprises:

transmitting, by the first collection resource, the third request to the leaf node resource through the second collection resource.

17. The apparatus according to claim 15, wherein the link information of each leaf node resource comprises at least one of a resource identifier, an interface type, port information, and a resource type.

18. The apparatus according to claim 14, wherein the resources corresponding to the link information obtaining interface comprise: one or more resources processed by the link information obtaining interface, and one or more leaf node resources to which each of the one or more resources is linked in a nested manner.

* * * * *